Figure 1:
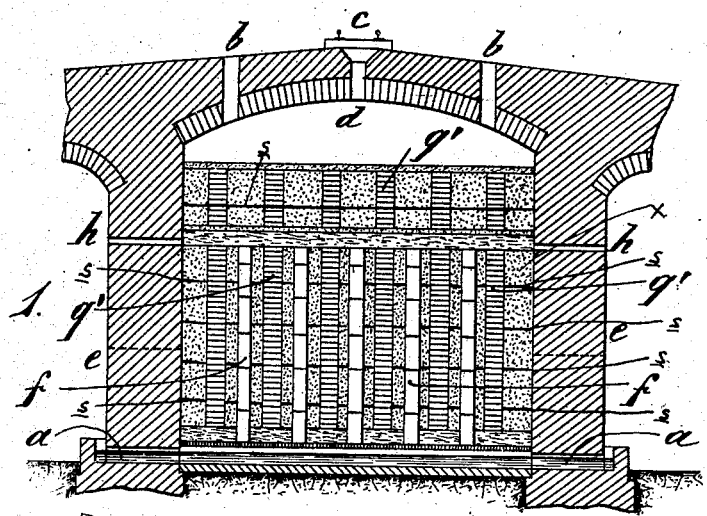

No. 840,253. PATENTED JAN. 1, 1907.
G. RAMBALDINI.
ROASTING OF PYRITOUS MINERALS.
APPLICATION FILED JAN. 28, 1902.

Witnesses:
C. D. McVay
L. Douville

Inventor:
Giovanni Rambaldini
by Wiedersheim & Fairbanks,
Attorneys.

UNITED STATES PATENT OFFICE.

GIOVANNI RAMBALDINI, OF MINIERA DI BOCCHEGGIANO, ITALY.

ROASTING OF PYRITOUS MINERALS.

No. 840,253.      Specification of Letters Patent.      Patented Jan. 1, 1907.

Application filed January 28, 1902. Serial No. 91,600.

*To all whom it may concern:*

Be it known that I, GIOVANNI RAMBALDINI, mining engineer, a subject of the King of Italy, residing at Miniera di Boccheggiano, Province of Grosseto, in the Kingdom of Italy, have invented certain new and useful Improvements Relating to the Roasting of Pyritous Minerals, of which the following is a specification.

Desulfurizing roasting of pyritous minerals is preferably employed for pyritous minerals poor in copper, but may also be employed in the same manner for mixed sulfid minerals by merely varying the temperature of desulfurization. The object is to convert metallic sulfids into sulfates—*i. e.*, the insoluble compounds of the metal into soluble compounds—and it is more particularly designed to serve as a substitute for the roasting in a heap in the open air, it being based on the same principle and utilized in the hydrometallic treatment of sulfid copper ores which contain this metal in large proportions in the form of copper pyrites. In this case—as the only object of the treatment is nearly always the extraction of the copper and is therefore independent of the method and the chemical formula employed for obtaining the copper as the final result, the contemporary presence of sulfate of copper and sulfate of iron derived from the sulfids is always prejudicial—the desulfurizing roasting in closed chambers, as hereinbefore stated, is effected in the following manner by obtaining, first, the maximum yield of copper in a soluble form; second, the minimum yield of iron, also in a soluble form. The two characteristic reactions of this roasting process are, as far as possible, as follows:

(1) $Fe_2Cu_2S_4 + 15O = Fe_2O_3 + 2CuSO_4 + 2SO$ (2) $2FeS_2 + 11O = Fe_2O_3 + 4SO_2$, the first of which for each atom-gram of copper develops three hundred and eleven great calories and the second for each atom-gram of iron two hundred and forty great calories.

The two essentially-required conditions are:

First. Temperature of 700° centigrade, as far as possible constant, and never above it, with the object of decomposing all the sulfate of iron without decomposing the sulfate of copper. Indeed, the former begins to decompose at 450° centigrade, while its decomposition is complete at 600°, whereas the latter decomposes completely only above 700°–750° centigrade.

Second. Crushing as small as possible, so as to increase the surface of the mineral exposed to the action of the oxidizing medium and also to avoid the well-known phenomenon of the formation of a core of insufficiently-desulfurized copper, which would be facilitated by the use of large pieces.

In order to effect the first-mentioned condition, it is necessary to insure a careful superintendence during the entire process and the exact and frequent determination of the temperature at the center of the mass where the temperature is greatest and where it should not exceed 700° centigrade. In order to effect the second condition in a practical manner and without too much interfering with the circulation of the gas and the renewal of the oxidizing medium, it is necessary, first, to carry out the process under shelter against the elements; second, to carry the crushing very far and classify the product with judgment in separating the granulous portion from the powder; third, to roast these two portions in the same mass by completely abandoning the horizontal stratification and, on the contrary, adopting the arrangement of vertical columns or heaps.

The following is the practical procedure embodying the foregoing principles: After the preliminary breaking of the mineral the latter is ground so as to form the largest possible quantity of granular material, after which the material is carefully screened into three separate heaps, viz—fine, medium, and large—for recrushing. The fine portion represents as near as possible about the fifth part of the total material, and this is simply moistened with water, without, however, the maximum moisture which it can imbibe. Under these conditions it can be kneaded roughly and can assume and retain the form of the vessel in which it may be slightly compressed, but not so far as to enable it to be formed into blocks, as has been done heretofore. The mineral thus prepared is subjected direct to roasting.

Figure 2:
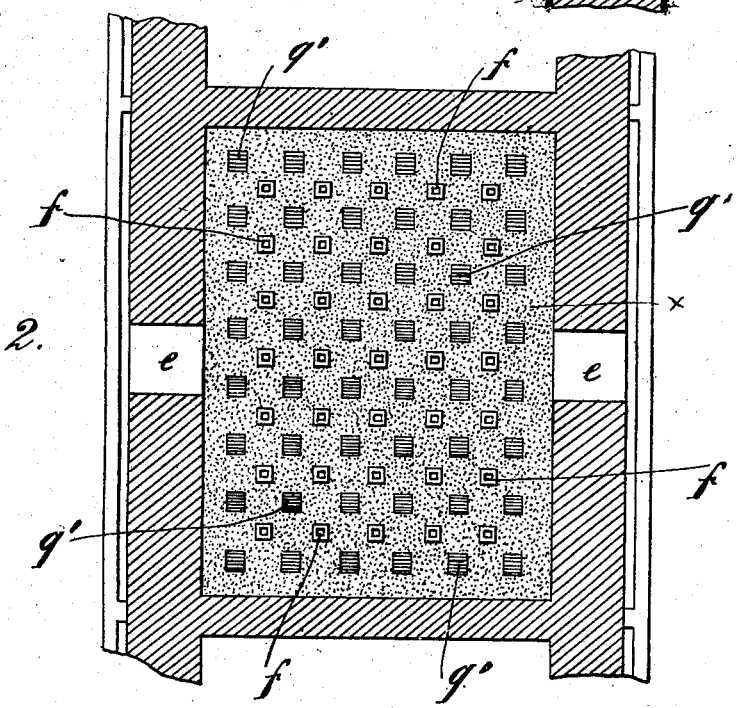
Figure 3:
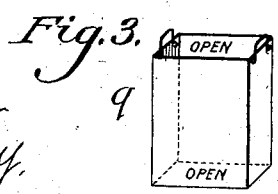

The roasting is carried out in closed chambers of rectangular form, and, in the accompanying drawings, Figure 1 represents a section, and Fig. 2 a plan, of the same. Fig. 3 is a perspective view of one of the open-ended boxes.

The entrance of air takes place through a series of channels $a\ a$, formed in the base of the lateral walls and so arranged as to permit of being continued in the interior in all directions by the insertion of dry bricks, and thus forming a false floor which is permeable to air and leading to the free space left between the two floors. The egress of the gases is facilitated at the top through openings $b\ b$.

The mineral is supplied by means of the small railway $c$, from which it is discharged into the funnels $d$ and then discharged, after roasting, through the lower doors $e\ e$, which during the roasting are kept closed.

The manner of operating is as follows: Upon the false floor are placed fagots $s$ and pieces of wood, which during the first period serve as a filter for the air and facilitate the roasting of the lower strata too much exposed to cooling. The said strata are traversed by a certain number of small chimneys $f\ f$, constructed of dry bricks of convenient size and designed to convey the air to the level of the flame. Alternately with these small chimneys there are placed upon the floor in vertical piles square boxes $q$, of sheet-iron, open at both ends and furnished at their upper ends with strong handles. These boxes are not seen in Fig. 1, as the boxes are supposed to have been removed, the ore-columns only being visible. After having constructed the small chimneys $f\ f$ to the height of the boxes the granulated mineral $x$ is charged through the funnels $d$, and by taking proper precautions all the free spaces are filled up to the same height. Then the finely-ground moistened mineral is caused to fall into the boxes by pressing it well down. After thus one strata has been prepared the next strata is formed in the same manner by lifting the boxes, without, however, completely withdrawing the same and by continuing the small chimneys $f\ f$ and again placing a thin layer of fagots in the empty spaces between the boxes and the said chimneys. Then the third and fourth strata, &c., are formed until a certain height $h\ h$ is reached—*i. e.*, the level for lighting. Upon reaching this point all the columns and small chimneys are interrupted, and the latter are covered with bricks and the whole leveled up with larger-size minerals, and finally a good bed of sticks, wood, and coal is directly superposed, so as to form an arrangement interlaced with small channels containing wood and a little tow and petroleum. All the said channels are brought into intercommunication by providing two cross-channels through the lateral walls within easy reach by hand at the exterior in order to permit of the simultaneous lighting of all superposed combustible materials. Above this bed after having distributed a thin layer of granulated mineral the construction is carried farther in the same manner as before, but without the small chimneys, and is continued to the height of about one-third or one-fourth of the full height of charging. Lastly, the boxes $q$ are removed and the materials $q'$ leveled and the whole covered with a thin layer of suitable mineral. In lighting the kiln it suffices to set fire to the tow projecting to the exterior at the reach of the hand and at the same time start the draft. It is evident that changes may be made in this process, especially with the object of eliminating the small chimneys $f$, which are cumbersome and expensive, and of facilitating the ingress of air into the interior of the columns of mineral. After thus starting the kiln the fire should be vigilantly kept under observation by so regulating the draft, as before mentioned, so as to prevent the temperature from exceeding 700° centigrade. The propagation of the fire usually takes place from top downward. It is, indeed, necessary that the fire should advance in the opposite direction to the movement of the gases, and this as slowly as possible, so as to facilitate and accelerate the oxidation of the upper strata. The temperature at the center, as before mentioned, must not exceed 700° centigrade, so as not to cause the complete decomposition of the sulfate of copper, and it should be above 600° centigrade, so as to completely decompose the sulfates of iron. However, owing to the losses of heat, it is but natural that this temperature is always decreasing from the center toward the exterior, where a portion of the sulfates of iron remains undecomposed. It will never be possible to eliminate by roasting only all the soluble iron salt, and this residue of iron will remain in great preponderance in the ferric state because by means of the said process, which is an energetic oxidizing process, the ferrous compounds (reduced and unstable) become converted little by little into ferric compounds of a more stable nature. At first this would appear naturally to constitute a nuisance; but really the presence of the undecomposed ferric sulfate must to a certain extent be considered a real necessity for effecting the elimination of the copper. It is necessary to maintain the temperature below 700°, and at about this temperature the sulfate of copper remains unchanged—*i. e.*, as $CuSO_4$—because, as is well known, this salt when heated to dark red commences to decompose partially by forming dibasic sulfate, $(CuSO_4, CuO.)$ However, this sulfate, although very soluble in the presence of an acid, is only partly soluble in water, in the presence of which, besides the normal sulfate $SO_4Cu$, it forms other basic sulfates always more complex and less soluble, and this necessitates that during the attack on the roasted mineral—*i. e.*, during lixiviation—there should exist or be formed within the water an agent which possesses the property of imparting to the basic sulfate of copper the acid radical required by it—for example, $SO_4$. In this case this agent may advantageously be ferric sulfate, which, indeed, and especially so at the moment when it commences to dissolve, produces an energetic action upon the oxid of copper $$Fe_2(SO_4)_3 + CuO = 3SO_4Cu + Fe_2O_3,$$

and consequently upon the basic sulfate of copper, ($CuSO^4CuO$,) in which the combination between the base CuO and the salt may be kept very weak. Thus 30.7 grand calories are developed for every atom-gram of sulfated copper and the change of bases takes place, whereby hydrated peroxid of iron is precipitated. This is doubly useful in the present case, because if it permits, on the one part, the dissolution of the copper it produces, on the other part, the precipitation of a certain portion of the iron which still existed in the solution. Parting from this principle the theory would naturally be that the quantity of ferric sulfate still present in the mineral after roasting ought to correspond to the base CuO, ready to be dissolved after the largest portion of the foregoing chemical equation. However, in reality, if the amount of sulfur in the mineral is originally somewhat great the quantity of ferric sulfate may be increased and the excess afterward remains in the solutions. This, as has been said before, has a noxious effect on all the successive operations in the hydrometallurgical treatment, and it will be well to avoid the same as much as possible by limiting from the beginning by the roasting itself the excess of ferric sulfate to a minimum without, however, eliminating it completely. Therefore in order not to disturb the residing temperature in the mass it is here proposed to have recourse to the action of steam upon the metallic sulfids, it being well known that these sulfids by reason of the heat and the presence of steam form the respective oxids:

$$MS + H_2O = MO + H_2S$$

by developing sulfureted hydrogen. This reaction also takes place at low temperatures. For pyrites and copper pyrites it commences at 200° centigrade, and if it takes place without the aid of water it is always endothermic, and therefore most convenient for cooling the mass on fire. Further, this may be useful also for another reason, because the sulfereted hydrogen which is generated may fix a portion of the sulfurous anhydrid ($SO^2$) simultaneously produced in the process and which is mostly allowed to escape into the air. Indeed, in humid and cold climates these two gases react upon one another by yielding sulfur and polythionic acids in variable proportions. However incomplete this reaction may be for dilute gases and notwithstanding that it requires special conditions of an agent it may be useful in trying a practical solution for the fixing of the sulfurous anhydrid.

Thus the present method of roasting in closed chambers, which by itself necessitates the collection of the products of combustion, will more than any other be capable of supplying suitable means for the fixing of the $SO_2$. For example, upon the base of the foregoing considerations it will be easy to calculate that a mineral which has only one per cent. of sulfur and three per cent. of copper when subjected to roasting in closed chambers even if it yielded all its copper and also three per cent. of iron in form of sulfates may still produce gas with 5.25 per cent. of $SO_2$, and thus be suitable for application in any convenient manufacture of sulfuric acid by the ordinary process in lead-chambers. This result with minerals so poor in sulfur would, on the contrary, be absolutely impossible with any other process of roasting with intensive working.

The chimneys facilitate the access and the diffusion of the air within the mass and render the ignition both safer and quicker. They are covered with brick in order to prevent the ores from falling therein while the same are charged and arranged in strata.

The purpose of the arrangement in vertical columns is that of facilitating the access of air and the circulation of gases throughout the same. A horizontal stratification of alternately finely-comminuted and granular material would, on the contrary, render the circulation extremely difficult. It would then be necessary to limit the crushing in order not to prevent the circulation of the gases entirely, while it is desired, on the contrary, to crush the ores as finely as possible in order to facilitate the oxidation, and consequently the obtaining of sulfates.

No special arrangement is necessary to allow of the fire advancing downwardly. Should the combustion-gases advance upwardly—that is to say, the ignition take place near the bottom—said gases after having passed through a certain mass of combustible material would become inert and unable to further entertain the combustion in the overlying strata. If the mass were high, a part of the pyrites would not burn at all. If, on the contrary, the ignition takes place at the top, the stratum directly underlying the top stratum, which is burning, would be heated by the heat developed by said top stratum being contained in an oxidizing atmosphere, owing to the free oxygen in the air coming from below, and the presence of the steam will also enter in combustion without difficulty. The above explanation as applied to the second stratum also applies to a third stratum immediately underlying the second, and so on the combustion proceeds downwardly, as in the case with a great number of kilns and roasting apparatus, without any difficulty when the combustion begins at the top and the air is introduced from below.

What I claim, and desire to secure by Letters Patent of the United States, is—

1. The herein-described process for treating minerals which consists in effectually crushing the materials for treatment, limiting the maximum size between ten and fifteen millimeters, obtaining the greatest possible quantity of granular material, roasting the same and separating the granular portion.

2. In the process of treating minerals, the step which consists in roasting the materials in a mass, and disposing the material in vertical columns and bringing all of said columns into intercommunication.

3. In a process for treating minerals, roasting the same in a mass, disposing the same in vertical columns and bringing all of said columns into intercommunication, oxidizing the sulfids during roasting, and maintaining the temperature at the center of the mass at substantially 700° centigrade.

In testimony whereof I have hereunto set my hand, in presence of two subscribing witnesses, this 10th day of January, 1902.

GIOVANNI RAMBALDINI.

Witnesses:
  EMILIO MASI,
  ANTONIO MORISANDI.